United States Patent
Mansour et al.

(10) Patent No.: US 7,801,163 B2
(45) Date of Patent: *Sep. 21, 2010

(54) BUFFER MANAGEMENT POLICY FOR SHARED MEMORY SWITCHES

(76) Inventors: Yishay Mansour, 9 Ha'avoda Street, Apt. 24, Tel Aviv (IL) 63821; Alexander Kesselman, 36/8 Ha'am Ha'tzarfati Street, Ramat Gan (IL) 52572

( * ) Notice: Subject to any disclaimer, the term of this patent is extended or adjusted under 35 U.S.C. 154(b) by 203 days.

This patent is subject to a terminal disclaimer.

(21) Appl. No.: 11/405,024

(22) Filed: Apr. 13, 2006

(65) Prior Publication Data

US 2007/0002882 A1    Jan. 4, 2007

Related U.S. Application Data

(63) Continuation of application No. 09/918,347, filed on Jul. 30, 2001, now Pat. No. 7,139,280.

(51) Int. Cl.
  *H04L 12/28* (2006.01)
(52) U.S. Cl. .............. 370/412; 370/230; 370/230.1; 370/374; 370/378; 370/386; 370/428; 370/429; 370/415; 370/417; 711/117; 711/129; 711/147; 711/153; 711/170; 711/172; 711/173
(58) Field of Classification Search ............. 370/412, 370/428, 415, 417, 230.1, 374, 378, 386; 711/117, 129, 147, 153, 170, 173
See application file for complete search history.

(56) References Cited

U.S. PATENT DOCUMENTS

| 5,231,633 | A   |   | 7/1993  | Hluchyj et al.              |
|-----------|-----|---|---------|-----------------------------|
| 5,541,912 | A   |   | 7/1996  | Choudhury et al.            |
| 5,838,994 | A   | * | 11/1998 | Valizadeh ............ 710/56 |
| 5,889,762 | A   | * | 3/1999  | Pajuvirta et al. ...... 370/230 |
| 5,909,547 | A   | * | 6/1999  | Mitra .................. 709/213 |
| 6,549,541 | B1  | * | 4/2003  | Sainio et al. ........ 370/412 |
| 6,556,578 | B1  | * | 4/2003  | Silberschatz et al. ... 370/412 |
| 6,570,876 | B1  | * | 5/2003  | Aimoto ............. 370/389 |
| 6,687,254 | B1  | * | 2/2004  | Ho et al. ............ 370/412 |

(Continued)

OTHER PUBLICATIONS

Daniel D. Sleator, et al., "Amortized efficiency of list update and paging rules", Communications of the ACM, vol. 28, No. 2, Feb. 1995, pp. 202-208.

(Continued)

*Primary Examiner*—Aung S Moe
*Assistant Examiner*—Christopher P Grey
(74) *Attorney, Agent, or Firm*—Stolowitz Ford Cowger LLP

(57) ABSTRACT

A method for allocating space among a plurality of queues in a buffer includes sorting all the queues of the buffer according to size, thereby to establish a sorted order of the queues. At least one group of the queues is selected, consisting of a given number of the queues in accordance with the sorted order. A portion of the space in the buffer is allocated to the group, responsive to the number of the queues in the group. A data packet is accepted into one of the queues in the group responsive to whether the data packet will cause the space occupied in the buffer by the queues in the group to exceed the allocated portion of the space.

43 Claims, 2 Drawing Sheets

U.S. PATENT DOCUMENTS

| | | | |
|---|---|---|---|
| 6,788,697 B1* | 9/2004 | Aweya et al. | 370/412 |
| 2002/0048277 A1* | 4/2002 | Bennett | 370/412 |
| 2002/0075799 A1* | 6/2002 | Bennett | 370/229 |
| 2006/0209820 A1* | 9/2006 | Arai et al. | 370/389 |
| 2007/0067484 A1* | 3/2007 | Cheung et al. | 709/231 |
| 2008/0086751 A1* | 4/2008 | Horn et al. | 725/87 |

OTHER PUBLICATIONS

Andras Veres, et al., "The chaotic nature of TCP congestion control", Proc. INFOCOM 2000, pp. 1715-1723, Mar. 2000.

Walter Willinger, et al., "Self-similarity through high-variability: statistical analysis of ethernet LAN traffic at the source level", ACM SIGCOMM'97.

United States Patent and Trademark Office; U.S. Appl. No. 09/918,347, filed Jul. 30, 2001; File History.

Noboru Endo, et al., "Shared Buffer Memory Switch for an ATM Exchange", IEEE Transactions on Communications, vol. 41, No. 1, Jan. 1993, pp. 237-245.

Marek I. Irland, "Buffer Management in a Packet Switch", IEEE Transactions on Communications, vol. COM-26, No. 3, Mar. 1978, pp. 326-377.

Farouk Kamoun, et al., "Analysis of Shared Finite Storage in a Computer Network Node Environment Under General Traffic Conditions", IEEE Transactions on Communications, vol. COM-28, No. 7, Jul. 1980, pp. 992-1003.

Guy Latouche, "Exponential Sharing a Finite Storage: Comparison of space Allocation Policies", IEEE Transactions on Communications, vol. COM-28, No. 6, Jun. 1980, pp. 910-915.

G. J. Foschini, et al., "Sharing Memory Optimally", IEEE Transactions on Communications, vol. COM-28, No. 3, Mar. 1983, pp. 352-360.

A. K. Choudhury, et al., "Dynamic queue length Thresholds for Shared-Memory Packet Switches", IEEE/ACM Transactions on Communications, vol. 6, No. 2, Apr. 1998, pp. 130-140.

Harry G. Perros, et5 al., "Call Admission Control Schemes: A Review", IEEE Commun. Maga., Nov. 1996, pp. 82-91.

Ashok Erramili, et al., "Monitoring Packet Traffic Levels", Proc. IEEE Globecom '94, vol. 1, Dec. 1994, pp. 274-280.

Israel Cidon, et al., "Optimal Buffer Sharing", IEEE JSAC 13:7, Sep. 1995, pp. 1229-1339.

Andre Baiocchi, et al., "Loss Performance Analysis of an ATM Multiplexer Loaded with High-Speed On-Off Sources", IEEE JSAC 9:3, Apr. 1991, pp. 388-392.

Xian Cheng, et al., "A Finite Buffer Two Class Queue with Different Scheduling and Push-Out Schemes", Proc. IEEE INFOCOM '92, May 1992, pp. 231-241.

Hans Kroner, "Comparative Performance Study of Space Priority Mechanisms for ATM Networks", IEEE INFOCOM '90, Jun. 1990, pp. 1136-1143.

Guo-Liang Wu, et al., "A Buffer Allocation Scheme for ATM Networks: Complete Sharing Based on Virtual Partition", IEEE/ACM Trans. Networking 3:6, Dec. 1995, pp. 660-670.

Yonghwan Kim, et al., "Timescale of Interest in Traffic Measurement for Link Bandwidth Allocation Design", IEEE INFOCOM '96, Mar. 1996, pp. 738-748.

Erol Gelenbe, et al., "Bandwidth Allocation and Call Admission Control in High-Speed Networks", IEEE Commun. Mag., May 1997, pp. 122-129.

H.M. AboElFoton, et al., "An Integrated Call Admission and Buffer Management Scheme for LAN Interconnection Over a Shared-Memory ATM Switch", Comp. Commun. 21, 1998, pp. 697-714.

Krishnan Kumaran, et al., "Performance and Fluif Simulations of a Novel Shared Buffer Management System", Proc. IEEE INFOCOM '98, Mar. 1998, pp. 1149-1161.

Santos Krishnan, et al., "Dynamic Partitioning: A Mechanism for Shared Memory Management", Proc. IEEE INFOCOM '99, Mar. 1999, pp. 144-152.

Ashok Erramilli, et al., "Self-Similarity in High-Speed Network traffic Measurements: Fact or Artifact?", 12.sup.th Nordic Teletraffic Seminar NTS 12(VTT Symposium 154), Aug. 1995, pp. 299-310.

Simon Fong, et al., "Performance Evaluation of Shared-Buffer ATM Switches Under Self-Similar Traffic", 1997 IEEE Int. Performance, Computing and Comm. Conf. Feb. 1997, pp. 252-258.

Hui Zhang, "Service disciplines for guaranteed performance service in packet-switching networks", Proc. IEEE 83:10, Oct. 1995.

W.A. Aiello, et al., "Competitive queue policies for differentiated services", Proceedings of INFOCOM 2000, pp. 431-440.

Mark e. Crovella, et al., "Self-similarity in world wide web traffic: evidence and possible causes", IEEE/ACM trans. Networking 5(6): 835-846, Dec. 1997.

Anja Feldman, et al., "Dynamics of IP traffic: A study of the role of variability and the impact of control", SIGCOMM '99, Cambridge, Massachusetts, Sep. 1999.

M. G. Hluchyj, et al., "Queueing in high-performance packet switching", IEEE J. Select. Areas Commun., vol. 6, pp. 1587-1597, Dec. 1988.

Alexander Kesselman, et al., "Buffer overflow management in QoS Switches", to appear in STOC 2001.

Alexander Kesselman, et al, "Loss-bounded analysis for differentiated services", to appear in SODA 2001.

Yishay Mansour, et al., "Optimal Smoothing Schedules for Real-Time Streams", to appear in PODC 2000.

Vern Paxon, et al., "Wide-area traffic: the failure of poisson modeling", IEEE/ACM Trans. on Networking, Jun. 1995.

Parag Pruthi, et al., "Heavy tailed on/off source behavior and self-similar traffic", Proceedings of the ICC'95, Jun. 18-22, 1995.

Schwelfel et al., "Analytic model of performance in telecommunication systems, based on On-Off traffic sources with self-similar behavior", 7.sup.th Int. Conf. Telecommunication systems, Nashville, Tennessee, Mar. 18-21, 1999.

Schwelfel, et al., "Buffer size issues in the presence of self-similar traffic", Third IFIP Workshop on Traffic Management and Design of ATM Networks, London, Apr. 26-27, 1999.

Aboeifoton, H.M. et al.; "An integrated call admission and buffer management scheme for LAN Interconnection over a shared-memory ATM switch"; 1998, *Comp. Commun.*, vol. 21, pp. 697-714.

Aiello, W.A. et al.; "Competitive queue policies for differentiated services"; 2000, *Proceedings of INFOCOM*, pp. 431-440.

Aspens, James et al.; "On-line routing of virtual circuits with applications to load balancing and machine scheduling"; 1993, *Proceedings of the 23rd ACM Symp. On Theory of Computing*.

Arpachi, M. et al.; "Buffer management for shared-memory ATM switches"; 2000 *IEEE Commun. Surveys*.

Baiocchi, Andre et al.; "Loss Performance Analysis of an ATM Multiplexer Loaded with High-Speed On-Off Sources"; 1991, *IEEE JSAC 9:3*, pp. 388-392.

Borodin, Allan et al.; "Online computation and competitive analysis"; 1998, *Cambridge University Press*.

Choudhurry, A.K. et al.; "Dynamic queue length Thresholds for Shared-Memory Packet Switches"; 1998, *IEEE/ACM Transactions on Communications*, vol. 6, No. 2, pp. 130-140.

Cidon, Israel et al.; "Optimal Buffer Sharing"; 1995, *IEEE JSAC*, vol. 13, No. 7, pp. 1229-1339.

Crovella, Mark E. et al.; "Self-similarity in world wide web traffic: evidence and possible causes"; 1997, *Networking*, vol. 5, No. 6, pp. 835-846.

Endo, Noboru et al.; "shared Buffer Memory Switch for an ATM Exchange"; 1993, *IEEE Transactions on Communications*, vol. 41, No. 1, pp. 237-245.

Erramili, Ashok et al.; "Monitoring Packet Traffic Levels"; 1994, *Proc. IEEE Globecom*, vol. 1, pp. 274-280.

Erramili, Ashok et al.; "Self-Similarity in High-Speed Network traffic Measurements: Fact or Artifact?"; 1995, *12th Nordic Teletraffic Seminar NTS 12 (VTT Symposium 154)* pp. 299-310.

Feldman, Anja et al.; "Dynamics of IP traffic: A study of the role of variability and the impact of control"; 1999, *SIGCOMM*.

Fong, Simon et al.; "Performance Evaluation of Shared-Buffer ATM Switches Under Self-Similar Traffic"; 1997, *IEEE Int. Performance, Computing and Comm. Conf.*, pp. 252-258.

Foschini, G.J. et al.; "Sharing Memory Optimally"; 1983, *IEEE Transactions on Communications*, vol. COM-28, No. 3, pp. 352-360.

Gelenbe, Erol et al.; "Bandwidth Allocation and Call Admission Control in High-Speed Networks"; 1997, *IEEE Commun.*, pp. 122-129.

Hluchji, M.G. et al.; "Queueing in high-performance packet switching"; 1988, *IEEE J. Select. Areas Commun.*, vol. 6, pp. 1587-1597.

Irland, Mark I.; "Buffer Management in a Packet Switch"; 1978, *IEEE Transactions on Communications*, vol. COM-26, No. 3, pp. 326-377.

Kamoun, Farouk et al.; "Analysis of Shared Finite Storage in a Computer Network Node Environment Under General Traffic Conditions"; 1980, *IEEE Transactions on Communications*, vol. COM-28, No. 7, pp. 992-1003.

Kesselman, Alexander et al.; "Buffer overflow management in QoS Switches"; 2001, *STOC*.

Kesselman, Alexander et al.; "Loss—bounded analysis for differentiated services"; 2001, *SODA*.

Krishman, Kumaran et al.; "Performance and Fluif Simulations of a Novel Shared Buffer Management System"; 1998, *Proc. IEEE INFOCOM*, pp. 1149-1161.

Krishman, Santos et al.; "Dynamic Partitioning: A Mechanism for Shared Memory Management"; 1999, *Proc. IEEE INFOCOM*, pp. 144-152.

Kroner, Hans; "Comparative Performance Study of Space Priority Mechanisms for ATM Networks"; 1990, *IEEE INFOCOM*, pp. 1136-1143.

Latouche, Guy; "Exponential Sharing a Finite Storage: Comparison of space allocation policies"; 1980, *IEEE Transactions on Communications*, vol. COM-28, No. 6, pp. 910-915.

Mansour, Yishay et al.; "Optimal Smoothing Schedules for Real-Time Streams"; 2000, *PODC*.

Paxon, Vern et al.; "Wide-area traffic: the failure of poisson modeling"; 1995, *IEEE/ACM Trans. on Networking*.

Perros, Harry G. et al.; "Call Admission Control Schemes: A Review"; 1996, *IEEE Commun.*, pp. 82-91.

Pruthi, Parag et al.; "Heavy tailed on/off source behavior and self-similar traffic"; 1995, *Proceedings of the ICC*.

Schwelfel et al.; "Analytic model of performance in telecommunication systems, based on ON-OFF traffic sources with self-similar behavior"; 1999, *7th Int. Conf. Telecommunication Systems*.

Schwelfel et al.; "Buffer size issues in the presence of self-similar traffic"; 1999, *Third IFIP Workshop on Traffic Management and Design of ATM Networks*.

Sleator, Daniel D. et al.; "Amortized efficiency of list update and paging rules"; 1995, *Communications of the ACM*, vol. 28, No. 2, pp. 202-208.

Veres, Andras et al.; "The chaotic nature of TCP congestion control"; 2000, *Proc. INFOCOM*, pp. 1715-1723.

Willinger, Walter et al.; "Self-similarity through high-variability: statistical analysis of Ethernet LAN traffic at the source level"; 1997, *ACM SIGCOMM*.

Wu, Guo-Liang et al.; "A Buffer Allocation Scheme for ATM Networks: Complete Sharing Based on Virtual Partition"; 1995, *IEEE/ACM Trans. Networking*, vol. 3, No. 6, pp. 660-670.

Yonghwan, Kim et al.; "Timescale of Interest in Traffic Measurement for Link Bandwidth Allocation Design"; 1997, *IEEE Commun.*, pp. 122-129.

Xian, Cheng et al.; "A Finite Buffer Two Class Queue with Different Scheduling and Push-Out Schemes"; 1992, *Proc. IEEE INFOCOM*, pp. 231-241.

Zhang, Hui; "Service disciplines for guaranteed performance service in packet-switching networks"; 1995, *Proc. IEEE*, vol. 83, No. 10.

\* cited by examiner

BUFFER MANAGEMENT POLICY FOR SHARED MEMORY SWITCHES

FIELD OF THE INVENTION

This invention relates generally to buffer management policies, and specifically to buffer management for shared memory switches.

BACKGROUND OF THE INVENTION

Because each node of a packet network typically receives packets from a multiplicity of other nodes and must re-direct these packets to a multiplicity of destinations (i.e. other nodes), the nodes of a network must be equipped with means for accomplishing such receipt and re-direct. Furthermore, because traffic in a network flows constantly, such means must be capable of performing both the receipt and the re-direct functions simultaneously.

The receiving and re-directing functions required of a node (also known together as the routing functions) are performed by a device called a switch. As each node has a multiplicity of input and output links, the prime purpose of the switch is to route incoming packets arriving on a particular input link to the proper output link. A number of different techniques have been proposed for carrying out the switching (routing) function. The present invention is concerned with improving one of these techniques, the technique known as shared memory.

A shared memory switch consists of a single memory having multiple input and output lines. FIG. 1 depicts schematically a typical shared memory switch 10, in which the input lines of the switch, denoted generally as 12, are all connected to a single input port 14, and the output lines, denoted generally as 16, are connected to a single output port 18. It will be appreciated that although in FIG. 1 N input lines and N output lines are depicted, the number of input and output lines need not be equal. At given time intervals, packets arriving on the input lines (the first packet on each line at each time interval) are multiplexed into a single stream which is then fed through the single input port into the memory for storage. Once inside the memory, packets are organized into separate output queues, one queue for each output line. The processes and apparatus controlling the storage of packets and their organization into queues are depicted schematically in FIG. 1 as controller 20, which controls the writing of multiplexed packets into the memory (WA) and the reading of multiplexed packets from the memory (RA). To send packets to their correct destinations, the process is reversed: at each time interval, an output stream of packets is formed by sequentially retrieving packets from the output queues (the first packet in each queue at each time interval), and this output stream is then de-multiplexed and the packets transmitted on the output lines. The multiplexing and de-multiplexing of packets is depicted schematically in FIG. 1 as S/P (serial-to-parallel) and P/S (parallel to serial) respectively.

In practice, at any given time a shared memory switch is engaged in all of the input and output processes (multiplexing, storing, organizing into queues and de-multiplexing): at set time intervals, packets at the heads of non-empty queues are sent to the corresponding output link, and incoming packets are sent to their assigned queues. For purposes of discussion throughout the remainder of this patent application, the Applicants will relate to input and output lines of the shared memory switch as if these lines were connected directly to the switch and the multiplexing/de-multiplexing step was unnecessary.

Because multiple cells arriving at the same time on different input lines may be destined for the same output line, switches must also be capable of buffering (sometimes referred to as queuing). While in theory a switch may buffer cells at the input or the output of the switch, in shared memory switches a third possibility is available, viz. to buffer the cells internally. Shared memory switches have gained popularity because, by appropriately controlling the memory read/write, the switching and buffering functions of the shared memory switch may be achieved simultaneously. This feature imparts significant advantages to shared memory switches: such switches do not suffer from throughput degradation (a drop-off in the total number of cells passing through the switch) due to "head-of-line blocking", a phenomenon inherent in input-buffered switches.

Buffer allocation determines how the total buffer space, i.e. the memory, will be used by individual output lines of the shared memory switch. The buffer allocation is in turned determined by implementation of a buffer management policy. Several such buffer management policies are known in the art. Known buffer management policies are based on a model of a shared memory switch having N output lines (and usually N input lines) and a total buffer space of M equally sized packets. Most of these policies operate on a non-preemptive basis, i.e. once a packet has been queued, it will not be removed from a queue, and therefore these policies involve determining whether an incoming packet will be accepted or rejected. (Packets which have been queued are sent to their destinations on a first-in-first-out (FIFO) basis.) For the sake of completeness, however, it is noted that some buffer management policies have been proposed which follow a preemptive policy. These buffer management policies are known as "push-out" or "drop-on-demand" and variations thereof, and involve "pushing out" an already queued packet under certain conditions. Because the "push-out" step is difficult to implement in practice at the speeds under which modern packet switches must operate, "push-out" and its variants have not been widely adopted commercially.

Of the non-preemptive buffer allocation policies, the two simplest policies are known as complete partitioning and complete sharing. In complete partitioning (CP), the entire buffer space is permanently partitioned among the N output lines. Although in principle each queue could be assigned a different amount of space, in practice under CP each queue is allocated an equal amount of buffer space, M/N packets for each of the N queues. Since the sum of individual output line allocations is equal to the total buffer memory M, complete partitioning does not provide any sharing. This can represented mathematically as follows: let M be the total buffer space (memory) in a shared memory switch having N output lines and N corresponding output queues, let $T_q$ be the buffer space allocated to queue q, and let $L_q$ be the buffer space actually occupied by queue q. In complete partitioning, $$L_q \leq T_q \tag{1}$$

for all q(q=1 to N) and $$\sum_{q=1}^{N} T_q \leq M \tag{2}$$

(Implicitly, this also means that the sum of buffer space occupied by all queues cannot exceed the total amount of memory available, i.e.

$$\sum_{q=1}^{N} L_q \le M \quad (3)$$

but this condition is true by definition for the shared memory switch, irrespective of the buffer allocation policy implemented.)

The advantage of complete partitioning is that the determination to accept or reject a packet is easy to make: if the buffer allocation for the queue to which an incoming packet is assigned is already full, the incoming packet is rejected; if the buffer allocation for the queue to which the incoming packet is assigned is not full, the packet is accepted. CP also ensures that the memory is allocated fairly among the output queues. The disadvantage of a complete partitioning policy is that the total memory is often under-utilized, since unused memory from an inactive queue cannot be utilized by a highly active queue temporarily requiring additional memory.

At the other extreme there is the complete sharing (CS) policy, in which all packets destined for all queues are accepted until the memory is completely full. Using the same notation as above, this can be expressed by adherence to condition (3), without adherence to conditions (1) or (2). While complete sharing ensures that the memory space will never be under-utilized (if necessary, the entire buffer space may be used), it also enables a single highly active queue to monopolize the buffer. This is unfair and can be detrimental to performance under some circumstances. For example, if the highly active queue contains packets which are part of an (extremely large) e-mail message, for which a delay of several seconds in transmission will not be critical, and other packets which are part of a real-time voice transmission are consequently rejected by the buffer, the recipient of the voice transmission will receive a garbled transmission. This intuitive insight has been borne out by computer modeling and simulation: under balanced traffic conditions, CS has been shown to outperform CP (in the sense that fewer packets are lost in CS), but under imbalanced traffic conditions, which more closely mimic traffic conditions in actual ISDN networks, CP outperforms CS.

To try to overcome the drawbacks of complete sharing and complete partitioning, but to still take advantage of the benefits of each of these buffer management policies, several hybrid buffer management policies have been proposed. One such policy is known as sharing with maximum queue lengths (SMXQ). In this policy, each output queue is allocated a finite amount of buffer space. Although in principle the allocation for each queue may vary, in practice each queue is typically allocated the same amount of buffer space. In this respect SMXQ is similar to CP. However, unlike in CP, the total buffer allocations may together exceed the total memory space M. Furthermore, unlike in CP (but as in CS), sharing between output queues is allowed. SMXQ can thus be expressed mathematically by adherence to the conditions of equations (1) and (3) above, but the inequality in (2) is reversed to yield condition (2') which must also be adhered to:

$$\sum_{q=1}^{N} T_q \ge M \quad (2')$$

The result of these conditions is that no single queue is allowed to monopolize the total buffer space, but by the same token a queue in need of additional space is able to utilize some of the unused space allocated to another queue. The degree of sharing allowed will be determined by the maximum queue length allowed: the closer the maximum queue length is to M/N (or more generally, the closer the total allocation for all queues approaches M), the more closely the policy approaches CP, and the closer the maximum queue length is to M, the more closely the policy approaches CS. Thus in SMXQ the maximum queue length is set as less than M but greater than M/N. Computer modeling and simulation has shown that under imbalanced traffic conditions, SMXQ generally outperforms both CS and CP.

It should be noted that to the best of the inventors' knowledge, there is at present no optimal solution for choosing the degree of sharing under imbalanced traffic conditions. The chief disadvantage of SMXQ is that if a situation arises where there are many active output lines, the total buffer space taken by these active lines may leave some other (lightly loaded) output line with insufficient space. This can be a problem if it is desirable to distinguish between different classes of packets, e.g. real-time voice transmission packets vs. e-mail packets.

Another solution intermediate between CP and CS is known as sharing with minimum allocation (SMA). In SMA, a minimum amount of buffer space is always reserved for each queue. In principle, the amount reserved for each queue may differ, but in practice an equal amount of space is reserved for each queue. The minimum amount $R_q$ reserved for queue q is set as less than M/N (the reservation equivalent to each queue under a CP policy in which all queues receive equal allocations) and greater than 0 (the reservation at which the policy is equivalent to CS). More generally, all queues may be given different non-zero minimum allocations. In mathematical terms, this can be expressed as adherence to conditions (4) and (4'):

$$\sum_{q=1}^{N} \max(L_q, R_q) \le M \quad (4)$$

$$R_q > 0 : q = 1 \dots N \quad (4')$$

wherein $\max(L_q, R_q)$ refers to the larger of the two values $L_q$ and $R_q$.

A third solution intermediate between CP and CS, known as sharing with maximum queue and minimum allocation (SMQMA), combines both SMXQ and SMA: a minimum amount of space is allocated for each output queue, but a maximum queue length is also imposed. The guarantee that each output line has a minimum amount of space allocated serves as a simple and convenient method for ensuring that high-priority traffic is allocated buffer space, even in a shared buffer environment. An example of a commercially available shared memory switch employing an SMQMA buffer management policy is the Cisco Lightstream 1010 switch, in which every output line has a fixed reservation for high priority continuous bit rate traffic. The remainder of the buffer space is used in accordance with an SMXQ policy.

SMXQ, SMA and SMQMA all involve static thresholds: they were developed under assumptions of static environments where traffic loads may be imbalanced (i.e. the queues of some output lines may be more heavily loaded than the queues of other output lines) but the overall traffic loads do not change with time. Such assumptions do not reflect the reality of most computer networks, in which overall traffic loads vary significantly over time. This leads to degradation in the performance of shared memory switches when the actual traffic conditions encountered in the network deviate from the nominal values that the switches were designed to accommodate. This has led to attempts to develop buffer management policies which can adapt to changes in network traffic conditions.

One such type of policy has been termed "adaptive control" (see Thareja & Agrawala, IEEE Trans. Commun., vol. COM-32, no. 6, June 1984, pp. 737-740). In this type of policy, the allocation for all output lines is revised in response to changes in traffic conditions. Traffic estimations are made by statistical measurements of incoming traffic, and these are compared to the conditions which existed at the last allocation update. The policy can thus determine when the allocation should next be revised and what the new allocation should be. While the general idea of an adaptive control policy appears useful, in practice it has been difficult to devise particular buffer management policies along these lines. For example, the statistical estimation of network traffic, which it was once thought would prove to be a trivial matter, has proven to be quite complicated. Also, it is much more difficult to determine an optimal allocation for N outputs than for two outputs, as was done by Thareja & Agrawala. Thus adaptive control policies have not been widely adopted.

Another type of policy is known as dynamic threshold (DT) (described in Choudhury et al., IEEE/ACM Trans. Commun. 6(2) April 1998, pp. 130-140). In DT, the queue length thresholds of the output lines are set as proportional to the current amount of unused buffer memory. In mathematical terms, $$L_q \leq \alpha F \quad (5)$$

for all q from 1 to N, wherein $\alpha$ is a proportionality constant and F is defined as $$F = M - \sum_{q=1}^{N} L_q \quad (6)$$

Packets or cells arriving for a given output line are rejected if the length of the queue for that output line exceeds the current threshold value, i.e. if condition (5) will be violated by acceptance of the incoming packet for queue q. During periods of overall light traffic, this enables some output queues experiencing relatively high activity to utilize most of the buffer space. As overall traffic flow increases and the demand for memory for other queues increases, the queue length threshold decreases, thus forcing heavily loaded queues to unload packets before said heavily loaded queues will be allowed to accept more packets, and enabling previously lightly loaded queues to fill up.

The principal difficulty with the dynamic threshold policy is that the proportionality constant $\alpha$ is set at some value and remains at this value throughout the use of the shared memory switch. However, computer modeling and simulation has shown that while proportionality constants over a range of values produce results which are better than pure CP or pure CS (or, in general, even better than SMXQ), the performance of the DT policy under different conditions differs with the value of the proportionality constant. Consequently, no single proportionality constant can be chosen which performs optimally over all network traffic conditions.

There is thus a need for a buffer management policy which can better optimize the use of the buffer space in a shared memory switch than buffer management policies which are presently known.

SUMMARY OF THE INVENTION

The present invention provides a method for managing the buffer allocation in shared memory devices. In a preferred embodiment of the invention, the device is a shared memory switch. This buffer allocation management method may be used to implement a known buffer management policy, such as SMXQ or, in a preferred embodiment of the invention, it may be used to implement a novel buffer management policy, which the inventors call the "harmonic" buffer management policy, which is also contemplated within the scope of the invention.

In its simplest embodiment, the present invention comprises sorting the queues in a buffer according to queue length to obtain a sorted order of the queues, selecting a group consisting of k queues in accordance with the sorted order, and allocating a portion of the space in the buffer to the group as unit. In a preferred embodiment of the invention, the total buffer space allocated to the selected group of queues constitutes a maximum amount of space available to the selected group of queues as a unit. This maximum amount of buffer space allotted to the k queues as a unit may be, and in a preferred embodiment of the invention is, disproportionately greater than the total maximum space that the k queues would collectively receive if a CP policy was implemented with respect to all queues in the buffer under which each queue received an equal allocation. In another preferred embodiment of the invention, a minimum amount of buffer space is reserved for the k selected queues as a group, with the provision that a minimum amount of buffer space is reserved for the remaining queues as well, wherein the total minimum amount of space reserved for the k selected queues is largest total minimum amount of space reserved for any group of k queues.

In accordance with a preferred embodiment of the invention, the allocation of space between the k queues of the selected group themselves is achieved by setting a set of conditions which must be adhered to in order for incoming packets destined for one of the k queues to be accepted. This set of conditions may be chosen so that the allocation between the queues of the group is equivalent to the implementation of a known buffer management policy with respect to the queues of the group, as will be explained in more detail hereinbelow. In a preferred embodiment of the invention, the set of conditions is chosen so that the allocation of buffer space between the queues of the group is done in accordance with the static or dynamic "harmonic" buffer management policy of the present invention, as will be explained in more detail hereinbelow.

Because the first step of the present method involves sorting and ordering the queues according to queue length, in principle all the queues in a buffer may be grouped into groups according to size. Each group of queues may contain an equal number of queues, e.g. in a buffer having 100 queues the queues may be divided into 10 groups of 10 queues each (group 1 containing the 10 largest queues, group 2 containing the 10 next largest queues, etc.) Alternatively, the groups of queues may contain different numbers of queues, e.g. in a buffer containing 100 queues the queues may be grouped into 4 groups, with the ten largest queues constituting group 1, the 20 next largest queues constituting group 2, the next 30 largest queues constituting group 3 and the remaining 40 queues constituting group 4. Conceptually, this may be thought of as selecting a group of 60 queues which is then sub-divided into 3 groups of 10, 20 and 30 queues respectively, with a fourth non-selected group of 40 queues remaining, or it may be conceived of as grouping the sorted queues of the buffer into four groups a priori. Irrespective of how the groupings are conceptualized, the conditions imposed for acceptance of a packet into one group of queues (i.e. the system of equations and inequalities which must be adhered to) need not be the same as the conditions imposed for acceptance of a packet into a different group of queues. Thus, the buffer space within each group of queues may be allocated in accordance with different criteria.

Preferably, the sorted order of the queues of the buffer is determined at regular intervals, either immediately prior to or immediately after packets are released from the queues.

In accordance with a preferred embodiment of the invention, there is provided a method for allocating space among a plurality of queues in a buffer, comprising:

sorting all the queues of the buffer according to size, thereby to establish a sorted order of the queues;

selecting at least one group of the queues consisting of a given number of the queues in accordance with said sorted order;

allocating a portion of the space in the buffer to said at least one group, responsive to the number of the queues in said at least one group; and accepting a data packet into one of the queues in said group responsive to whether the data packet will cause the space occupied in the buffer by the queues in the group to exceed the allocated portion of the space.

In a preferred embodiment of the invention, the queues of said at least one group of queues are largest among said plurality of queues.

In a preferred embodiment of the invention, the step of allocating the portion of the space comprises setting a size of the space proportional to a sum of a harmonic series.

In a preferred embodiment of the invention, the setting of the size of the space comprises establishing a total maximum buffer size $B_k$ for the k largest output queues, wherein $B_k$ is substantially given by $$B_k = \frac{M}{(\ln N + 1)} \sum_{i=1}^{k} \frac{1}{i}$$

wherein M is the total buffer space available to all queues, N is the number of output queues, and i is an integer index.

In one preferred embodiment of the invention, the selecting of the number k of the queues comprises selecting a fixed number of the queues.

In another preferred embodiment of the invention, k has a variable value.

In a preferred embodiment of the invention, k and $B_n$ are set in accordance with the equation:

$$B_k = \left(n + \frac{m}{c^{n+1}}\right) \cdot \frac{M}{\log_c N}$$

wherein $1 < c < N$, and n is the largest integer such that m and k satisfy the conditions $$0 \leq m \leq c^{n+1}$$

and $$k = \sum_{i=1}^{n} c^i + m.$$

In a preferred embodiment of the invention, buffer space is allocated within said at least one group of queues in accordance with a set of conditions which functionally define a known buffer management policy. In a preferred embodiment of the invention, the known buffer management policy is chosen from a group consisting of complete partitioning (CP), sharing with maximum queue lengths (SMXQ), sharing with minimum allocation (SMA), sharing with maximum queue length and minimum allocation (SMQMA), and dynamic threshold (DT).

In a preferred embodiment of the invention, the given number is fixed. In another preferred embodiment of the invention, the given number and the portion of the space in the buffer are variable.

There is also provided, in accordance with a preferred embodiment of the invention, a method for allocating space among N output queues in a buffer of size M, which comprises:

sorting all the queues of the buffer according to size, thereby to establish a sorted order of the queues;

selecting a number k of said N output queues in accordance with the sorted order;

establishing a total maximum buffer space of $B_k$ for said number k of the N output queues, wherein $B_k < M$;

ascertaining whether acceptance of an arriving packet destined for one of said number k of the N output queues will cause the space in the buffer used by said k queues together to exceed $B_k$; and if the acceptance of an arriving packet destined for one of the k queues will cause the space used by the k queues together to exceed $B_k$, rejecting said packet.

In a preferred embodiment of the invention, the selecting of a number k of said N output queues comprises selecting a number k of said N output queues that are largest among said N output queues.

In a preferred embodiment of the invention, the establishing of the total maximum buffer space available for the k queues comprises setting the maximum buffer size for the k queues such that $B_k$ is substantially given by $$B_k = \frac{M}{(\ln N + 1)} \sum_{i=1}^{k} \frac{1}{i}$$

wherein M is the total buffer space available to all queues, and N is the number of output queues, and i is an integer index which refers to the ordinal ranking of the queue length.

In a preferred embodiment of the invention, buffer space is allocated within said number k of the N output queues in accordance with a set of conditions which functionally define a known buffer management policy. In a preferred embodiment of the invention, the known buffer management policy is chosen from a group consisting of complete partitioning (CP), sharing with maximum queue lengths (SMXQ), sharing with minimum allocation (SMA), sharing with maximum queue length and minimum allocation (SMQMA), and dynamic threshold (DT).

In one preferred embodiment of the invention, the selecting of the number k of the queues comprises selecting a fixed number of the queues.

In another preferred embodiment of the invention, the value of k is variable.

In a preferred embodiment of the invention, the values of k and $B_n$ are set in accordance with the equations $$B_k = \left(n + \frac{m}{c^{n+1}}\right) \cdot \frac{M}{\log_c N}$$

wherein $1<c<N$, and n is the largest integer such that m and k satisfy the conditions $$0 \leq m \leq c^{n+1}$$

and $$k = \sum_{i=1}^{n} c^i + m.$$

There is also provided in accordance with a preferred embodiment of the invention a shared memory switch comprising:

a memory providing buffer space of size M, which is adapted to contain a plurality of output queues; and a controller, coupled to sort all the queues of the buffer according to size, thereby to establish a sorted order of the queues, and to allocate the space in the buffer to the output queues in accordance with the sorted order such that a portion of the space is allocated to a group of the queues consisting of a given number of the queues that are largest among the plurality of the queues responsive to the given number of the queues in the group.

In a preferred embodiment of the invention, the portion of the space within the memory is allocated by setting a size of the space proportional to a sum of a harmonic series.

In a preferred embodiment of the invention, the portion of the space within the memory is allocated for the k largest output queues and the total maximum buffer size $B_k$ for said k largest output queues is substantially given by $$B_k = \sum_{i=1}^{k} \frac{M}{(\ln N) + 1} \frac{1}{i}$$

wherein i is an integer index which refers to the to ordinal ranking of the queue lengths.

In a preferred embodiment of the invention, the portion of the space is allocated for the k largest output queues and the total maximum buffer size $B_k$ for the k largest output queues is substantially given by the equation $$B_k = \left(n + \frac{m}{c^{n+1}}\right) \cdot \frac{M}{\log_c N}$$

wherein $1<c<N$, and n is the largest integer such that m and k satisfy the conditions $$0 \leq m \leq c^{n+1}$$

and $$k = \sum_{i=1}^{n} c^i + m.$$

In a preferred embodiment of the invention, the switch has N output lines and N corresponding output queues, wherein the given number is denoted by k and said portion of the space available for the k largest output queues is denoted by $B_k$, wherein $B_k < M$.

In a preferred embodiment of the invention, $B_k$ is substantially given by the equation $$B_k = \frac{M}{(\ln N + 1)} \sum_{i=1}^{k} \frac{1}{i}$$

wherein i is an integer index which refers to the ordinal ranking of the queue in terms of queue length.

BRIEF DESCRIPTION OF THE DRAWINGS

The present invention will be better understood in connection with the drawings, in which.

DETAILED DESCRIPTION OF PREFERRED EMBODIMENTS OF THE INVENTION

Figure 1:
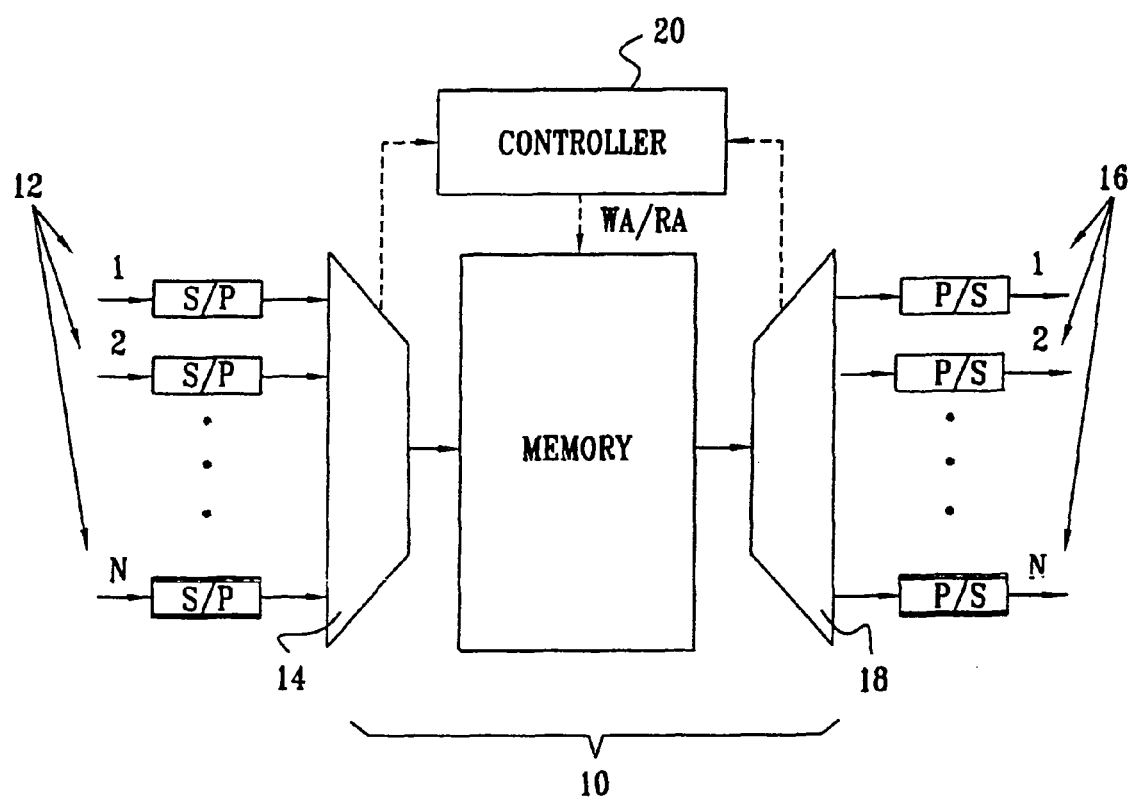
FIG. 1 is a schematic diagram of a typical shared memory switch known in the art.
Figure 2:
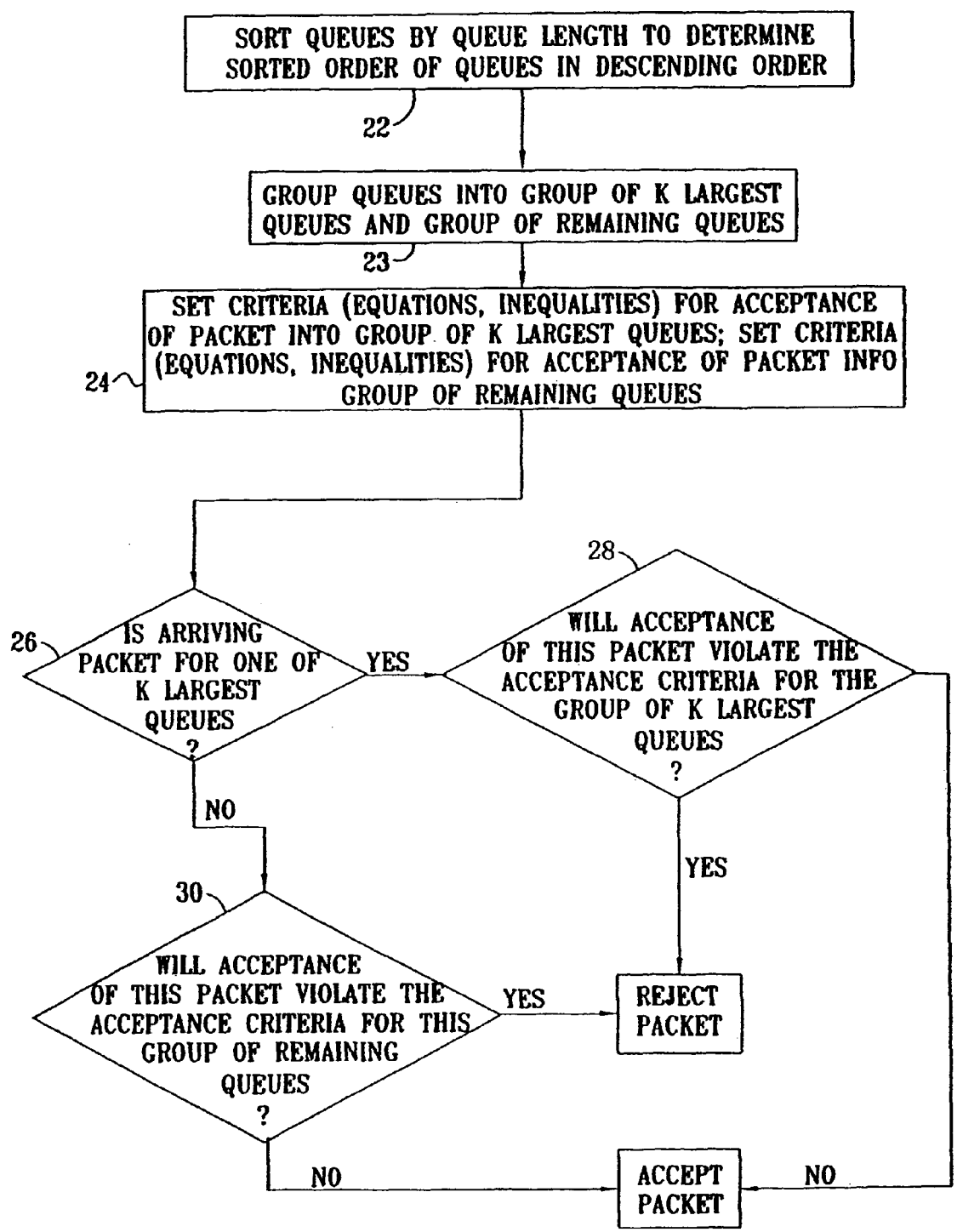
FIG. 2 is a flow chart illustrating implementation of a buffer management policy for determining whether to accept or reject an incoming packet, in accordance with a preferred embodiment of the present invention.

Reference is now made to FIG. 2. FIG. 2 shows schematically the operation of a buffer management policy in accordance with a preferred embodiment of the present invention. This policy is preferably implemented in a shared memory switch, such as that shown in FIG. 1, having N output lines. Alternatively, the policy may be adapted, mutatis mutandis, for use in managing input and output buffers in switches of other types, as well as for managing queues in buffers of other types.

As shown at step 22 in FIG. 2, the N queues of the buffer are first sorted by queue length. In the following discussion, it will be assumed that the sorting will be done in descending order, i.e. from longest to shortest, but it will readily be appreciated that in the practice of the invention, the queues may be sorted in ascending order.

As shown at step 23 in FIG. 2, the queues are then grouped into groups according to their sorted order. In the simplest case, depicted schematically in FIG. 2, the queues are divided into 2 groups, one group containing the k largest queues and the other group containing the remaining queues. However, it will be appreciated that in the practice of the invention, the queues may be grouped into a plurality of groups of queues, e.g. a first group containing the k largest queues, a second group containing the l next largest queues, a third group containing the m next largest queues, etc.

As shown at step 24 in FIG. 2, criteria for the acceptance of a packet into one of the k longest queues are established. The criteria are set forth in the form of a set of equalities and/or inequalities which must be fulfilled in order for an incoming packet to be accepted into the group of the k longest queues. Similarly, criteria for acceptance of a packet into the group of the remaining queues are also established in the form of a set of equalities and/or inequalities which must be fulfilled in order for an incoming packet to be accepted into the group of the k longest queues. If the ordered queues are grouped into a plurality of groups, acceptance criteria for packets destined for each group are established in step 24.

It will be appreciated that although as shown in FIG. 2, step 24 follows steps 22 and 23, in practice the criteria for acceptance of an incoming packet, i.e. the system of equalities and inequalities which must be adhered to, may be set prior to the sorting or grouping of queues according to queue length, and may in fact be set as permanently fixed a priori.

The set of equalities and/or inequalities which constitute the acceptance criteria for an arriving packet may be the set of equalities and/or inequalities which effectively implement a known buffer management policy, such as CP, as explained above. With respect to the group of the k largest queues in particular, in a preferred embodiment of the invention the k largest queues are collectively allocated a maximum buffer space of $B_k$, where $B_k < M$, the total memory available in the buffer.

The maximum buffer space $B_k$ allocated for the k largest queues may be set as a fixed proportion of the total buffer memory M, e.g. $(k/N) \times M$ or $M/2$. In accordance with a preferred embodiment of the present invention, the total maximum buffer allocation $B_k$ for the k queues of the group is set in accordance with the equation $$B_k = \frac{M}{\ln(N+1)} \sum_{i=1}^{k} \frac{1}{i} \qquad (7)$$

where i is an integer index which indexes the k queues of the group, i.e. i refers to the ranked order of the queue in terms of queue length. Because this equation is based on the harmonic series $1/i$, the buffer allocation policy based on (7) will be termed "Harmonic" throughout the remainder of this description.

It will be appreciated by those skilled in the art of buffer management that since the queues have been sequentially organized on the basis of queue length, the Harmonic policy allocates a relatively large amount of buffer space for individual bursts of packets (up to $M/((\ln N)+1)$ packets for one queue), but reserves buffer space for idle queues that may become active. This enables such idle queues to begin service immediately when called upon to do so. Furthermore, among the active queues, a degree of fairness is achieved: if there are exactly k active queues, then, if no conditions other than those of the Harmonic policy are imposed, the queue lengths of the k active queues converge to $B_k/k$ packets per queue.

As shown at steps 26 and 28 in FIG. 2, a packet arriving for one of the k largest queues will be rejected if acceptance of the packet would cause the memory utilized by the k queues as a group to violate the acceptance criteria for that group of queues. Thus, for example, when the acceptance criterion for the k largest queues is the condition that the buffer space collectively occupied by the k largest queues not exceed $B_k$, an incoming packet destined for one of the k largest queues will be rejected if its acceptance would cause the space occupied by the k queues to exceed $B_k$. For example, if $B_k$ is set in accordance with equation (7), then the packet will be rejected if acceptance of the packet would violate condition (8):

$$\sum_{q=i}^{k} L_i \leq B_k \qquad (8)$$

wherein i is an integer index for the k queues of the group.

It will be noted that adherence to condition (8) is a sufficient condition for adherence to the conditions of complete sharing within the k queues of the selected group.

As shown at step 28 in FIG. 2, if the cumulative threshold allocation $B_k$ for the k queues of the group will not be exceeded by acceptance of the incoming packet, and there is space in the buffer to accept the incoming packet, then the packet will be accepted.

As stated, the acceptance criteria for queues of either of the two groups of queues depicted in FIG. 2, or more generally for any of a plurality of groups of queues organized on the basis of queue length, may be chosen so as to effectively implement a known buffer management policy. Thus, for example, within the k queues of the group, the following policies could effectively be adopted, by choosing an appropriate system of equalities and/or inequalities to form the acceptance criteria for the group of k queues:

- A straight CS policy may be followed. As explained above, this is the default setting when no conditions beyond condition (8) are imposed on the acceptance or rejection of an incoming packet.
- A strict CP-type allocation may be used, wherein each of the k queues of the group receives $B_k/k$ memory (or wherein each of the remaining queues receives $(M-B_k)/(N-k)$ memory).
- SMXQ may be used, either with each of the k queues receiving the same maximum allocation or with each of the k queues receiving a different maximum allocation, as explained in the preceding paragraph.
- An SMA-type policy or an SMQMA-type policy may be used.
- The k queues of the group may also be made to follow a DT policy.

Thus, for example, if a buffer management policy in accordance with the present invention is employed in which the acceptance criteria for an incoming packet are those equations and inequalities which define an SMXQ policy, then the incoming packet destined for one of the k queues of the group will be accepted only if such acceptance will not cause violation of either condition (1) above or condition (9):

$$B_k \leq \sum_{i=1}^{k} T_i \qquad (9)$$

As shown at steps 26 and 30 in FIG. 2, if the incoming packet is not destined for one of the k largest queues, then the acceptance or rejection of the packet will depend on whether acceptance of the incoming packet will violate the terms of the buffer management policy implemented with respect to the N-k remaining queues.

As stated above, the present method may be practiced by grouping the sorted queues into a plurality of groups on the basis of queue lengths. In the case where the allocation for the k largest queues is set as a maximum allocation $B_k$ for the group of queues as a unit, this may conceptualized as subdividing the collective allocation $B_k$ into allocations for sub-groups of queues within the k queues of the group, wherein the sub-groups are also grouped on the basis of queue size. Thus, for example, maximum buffer space allocations for two groups of queues, one consisting of j queues (j<k), the other of k-j queues, may be made in accordance with the general equation $$B_{k-j} + B_j = B_k.$$

In principle, the number of subgroups of queues may be increased, up to a total of k such subgroups (one queue per sub-group), although in the latter case, the buffer management policy would in effect be reduced to a CP policy.

Thus, for example, for a shared memory switch having N outputs, the j largest queues could be allocated a maximum of $B_j$ buffer space:

$$B_j = \frac{M}{(\ln N + 1)} \sum_{i=1}^{j} \frac{1}{i} \tag{10}$$

where j<k, and the next k-j largest queues could then be allocated $B_{k-j}$ space, i.e.

$$B_{k-j} = B_k - B_j = \frac{M}{(\ln N + 1)} \sum_{i=j}^{k} \frac{1}{i}. \tag{11}$$

It will be appreciated that, as within the k queues of the group as a whole, sharing within each subgroup may be governed according to a CS policy (default in the absence of specification of acceptance criteria) or according to some other set of equalities and inequalities compatible with a non-preemptive buffer management scheme.

As stated, the ability of buffer management policies in accordance with preferred embodiments of the invention to allow for the sub-grouping of queues means that, at the extreme, individual queues can be defined as a sub-group, e.g. for each of the j largest queues (up to j=k), the maximum queue length for each queue can be set as $$B_i = \frac{M}{(\ln N + 1)} \frac{1}{i}; i = 1 \ldots j \tag{12}$$

This is actually a special case of a CP policy within the j largest queues, wherein the allocation for each queue is set in accordance with equation (12). Under such a policy, an incoming packet destined for the $i^{th}$ largest queue (out of the j queues for which $B_q$ is defined as in (12)) will then be rejected if its acceptance will violate the condition $$L_i < B_i \tag{13}$$

i.e., if more than i queues would each occupy more than $B_i$ buffer space as a result of acceptance of the packet.

The allocation of space within the other k-j queues of the group may similarly be effected in accordance with chosen acceptance criteria, which, if desired, may effectively implement known buffer management policies.

Similarly, the allocation of space in the remaining N-k queues in the buffer may be allocated in accordance with chosen acceptance criteria, which, if desired, may effectively implement known buffer management policies. The acceptance criteria used in the different groups of queues need not be the same.

Because, in accordance with the present invention allocation is determined on the ranked order of the sizes of the queues, the present method enables the shared memory switch to naturally adapt to the burstiness inherent in a network: when a queue of previously moderate activity suddenly becomes active, its allocation is allowed to increase, but not to increase so much that it monopolizes the available buffer space.

In some preferred embodiments of the invention, k is fixed. In other preferred embodiments of the invention, k, and thus $B_k$, is changed dynamically, preferably in accordance with the equation:

$$B_k = \left(n + \frac{m}{c^{n+1}}\right) \cdot \frac{M}{\log_c N} \tag{14}$$

wherein 1<c<N, and n is the largest integer such that m and k satisfy the conditions $$0 \leq m \leq c^{n+1}, \tag{15a}$$

and $$k = \sum_{i=1}^{n} c^i + m \tag{15b}$$

Buffer management policies based equations 14, 15(a) and 15(b) will be referred to hereinafter as "Parametric Harmonic" policies. It will be appreciate that a c value close to 1 approximates complete sharing between the queues of the group, and a c value close to N approximates complete partitioning between the queues of the group. The parametric harmonic policy divides the queues into $\log_c N$ blocks each of length $c^i$ (wherein=1, 2, ... $\log_c N$). Each block is allocated about $M/\log_c N$ memory slots. In accordance with the Parametric Harmonic policy, $$\sum_{i=1}^{k} L_i < B_k \text{ for } k = 1 \ldots N \tag{15c}$$

The inventors have subjected a Harmonic buffer management policy in accordance with the present invention to computer simulations of network traffic conditions, which have shown that the Harmonic buffer management policy achieves high throughput and easily adapts to changing load conditions. In comparison to DT and SQXM policies over a variety of conditions, Harmonic buffer management tends to track the better performer of these two policies under all conditions.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art

The invention claimed is:

1. A method comprising:
defining, from a plurality of queues in a buffer, at least one group of the queues according to a size of each queue, wherein each queue in the at least one group has a corresponding ranking in the at least one group based on the sizes of other queues in the at least one group;
allocating a portion of space in the buffer to the at least one group in accordance with a sum of a harmonic series that is based on the corresponding ranking in the at least one group, wherein the portion of the space in the buffer allocated to the at least one group includes buffer space that is not currently occupied by any of the queues in the at least one group and that is collectively available for use by any of the queues in the at least one group; and
determining to accept a data packet into one of the queues in the at least one group based, at least in part, on whether an addition of the data packet to one of the queues in the at least one group will cause the space occupied in the buffer by the queues in the group to exceed the allocated portion of the space in the buffer that is collectively available to the at least one group.

2. The method according to claim 1, wherein defining the at least one group comprises selecting for inclusion in the at least one group the queues that are largest among the plurality of queues.

3. The method according to claim 1, wherein allocating the portion of space in the buffer comprises setting a size of the portion of space in the buffer proportional to the sum of the harmonic series, wherein the harmonic series includes an inverse of each ranking corresponding to the queues in the at least one group.

4. The method of claim 3, wherein setting the size of the space comprises establishing a total buffer size based on a number of the plurality of queues, a number of the queues in the at least one group, and a ranked order of the queues in the at least one group based on queue length.

5. The method according to claim 1, further comprising allocating each queue within the at least one group of the queues a portion of the buffer allocated to the group based on a set of conditions defined according to a known buffer management policy.

6. The method according to claim 5, wherein the known buffer management policy is chosen from a group consisting of complete partitioning (CP), sharing with maximum queue lengths (SMXQ), sharing with minimum allocation (SMA), sharing with maximum queue length and minimum allocation (SMQMA), and dynamic threshold (DT).

7. The method according to claim 1, wherein a number of queues in the at least one group of queues is fixed.

8. The method according to claim 1, wherein a number of queues in the at least one group of queues and the portion of the space in the buffer are variable.

9. A method comprising:
selecting, from a plurality of output queues in a buffer, a number of the output queues based on a size of each output queue, wherein each selected output queue has a corresponding ordinal ranking based on a relative size of the selected output queue;
reserving a threshold level of space in the buffer for collective use by the selected number of output queues, wherein the reserved threshold level of space in the buffer is set according to a total number of output queues in the buffer, a total amount of space in the buffer, and a sum of a harmonic series that is based on the corresponding ordinal ranking of the output queues that are selected; and
when acceptance of an arriving packet destined for one of the selected number of the output queues will cause the space used by the selected number of the output queues together to exceed the threshold level of space for the selected number of output queues, rejecting the arriving packet.

10. The method according to claim 9, wherein the selecting of the number of output queues comprises selecting a number of the output queues that are largest among the output queues.

11. The method according to claim 9, further comprising allocating each queue within the number of the output queues a portion of the buffer allocated to the number of the output queues based on a set of conditions defined according to a known buffer management policy.

12. The method according to claim 11, wherein the known buffer management policy is chosen from a group consisting of complete partitioning (CP), sharing with maximum queue lengths (SMXQ), sharing with minimum allocation (SMA), sharing with maximum queue length and minimum allocation (SMQMA), and dynamic threshold (DT).

13. The method according to claim 9, wherein selecting the number of the output queues comprises selecting a fixed number of the output queues.

14. The method according to claim 9, wherein the threshold level of space in the buffer reserved to the number of output queues is variable.

15. The method of claim 14, wherein a variable value of the number of output queues is determined based on a parametric harmonic policy.

16. A shared memory switch comprising:
a memory configured to provide a buffer space that is adapted to include a plurality of output queues; and
a controller, configured to:
allocate at least a portion of the buffer space in the memory to a group of the output queues according to a sum of a harmonic series, wherein each output queue in the group has a corresponding ranking in the group based on sizes of other output queues in the group, wherein the harmonic series includes the corresponding ranking to each output queue in the group, and wherein the allocated portion of buffer space includes at least some space that is not currently occupied by any of the output queues in the group and is collectively available for use by any of the output queues in the group, and
determine to accept a data packet into one of the output queues in the group based, at least in part, on whether an addition of the data packet to one of the output queues in the group will cause the buffer space occupied in the memory by the output queues in the group to exceed the allocated portion of the space in the buffer for the group.

17. The switch according to claim 16, wherein the portion of the buffer space is allocated by setting a size of the buffer space proportional to the sum of the harmonic series, wherein the harmonic series includes an inverse of each ranking corresponding to the output queues in the group.

18. The switch of claim 17, wherein setting the size of the space comprises establishing
a total buffer size based on a number of the plurality of queues;
a number of the queues in the at least one group; and
a ranked order of the queues in the at least one group based on queue length.

19. The switch of claim 18, wherein the number of the queues in the at least one group is variable and the variable value of the number of the queues in the at least one group is determined based on a parametric harmonic policy.

20. The switch according to claim 16, wherein the switch has output lines and corresponding output queues, wherein the portion of the buffer space available for largest output queues is less than a total amount of buffer space.

21. The switch of claim 20, wherein setting the size of the space comprises establishing a total buffer size based on a number of the plurality of queues, a number of the queues in the at least one group, and a ranked order of the queues in the at least one group based on queue length.

22. A device comprising:
means for selecting at least one group of queues from a plurality of queues in a buffer, wherein the queues in the at least one group of queues each have a sequentially integer ranking in the at least one group of queues based on sizes of the queues in the at least one group of queues;
means for allocating a portion of space in the buffer according to a sum based on the sequentially integer rankings of the queues in the at least one group of queues, wherein the portion of the space in the buffer is allocated for collective use by the queues in the at least one group of queues, wherein the allocated portion of space in the buffer is larger than space currently occupied by the queues in the at least one group of queues; and
means for determining whether to accept a data packet into one of the queues in said at least one group of queues based, at least in part, on whether an addition of the data packet to one of the queues in the at least one group of queues will cause the space occupied in the buffer by the queues in the at least one group of queues to exceed the allocated portion of the space in the buffer for the at least one group of queues.

23. The device according to claim 22, wherein the means for selecting is configured to select for inclusion in the at least one group the queues that are largest among the plurality of queues.

24. The device according to claim 22, wherein the means for allocating is configured to set a size of the space proportional to a sum of a harmonic series that includes an inverse of each sequentially integer ranking corresponding to the queues in the group.

25. The method of claim 24, wherein the means for allocating is configured to set the size of the space by establishing a total buffer size based on a number of the plurality of queues, a number of the queues in the at least one group, and a ranked order of the queues in the at least one group based on queue length.

26. The device according to claim 22, further comprising means for allocating each queue within the at least one group of the queues a portion of the buffer allocated to the group based on a set of conditions defined according to a known buffer management policy.

27. The device according to claim 26, wherein the known buffer management policy is chosen from a group consisting of complete partitioning (CP), sharing with maximum queue lengths (SMXQ), sharing with minimum allocation (SMA), sharing with maximum queue length and minimum allocation (SMQMA), and dynamic threshold (DT).

28. The device according to claim 22, wherein a number of queues in the at least one group of queues is fixed.

29. The device according to claim 22, wherein a number of queues in the at least one group of queues and said portion of the space in the buffer are variable.

30. A method for allocating space among a plurality of queues in a buffer, the method comprising:
selecting at least one group of the queues, wherein the queues in the group are sequentially ranked according to their size;
allocating a portion of the space in the buffer to the at least one group according to a sum of a harmonic series based on the sequential rank of the queues in the at least one group, wherein the allocated portion of space in the buffer is larger than the space currently occupied by the queues in the at least one group; and
accepting a data packet into one of the queues in the at least one group responsive to whether the data packet will cause the space occupied in the buffer by the queues in the group to exceed the allocated portion of the space.

31. The method according to claim 30, wherein selecting the at least one group comprises selecting for inclusion in the at least one group the queues that are largest among the plurality of queues.

32. The method according to claim 30, wherein allocating the portion of the space comprises setting a size of the space proportional to the sum of the harmonic series that includes an inverse of each ranking corresponding to the queues in the group.

33. The method of claim 32, wherein setting the size of the space comprises establishing a total buffer size based on a number of the plurality of queues, a number of the queues in the at least one group, and a ranked order of the queues in the at least one group based on queue length.

34. The method according to claim 30, further comprising allocating each queue within the group of the queues a portion of the buffer allocated to the group based on a set of conditions defined according to a known buffer management policy.

35. The method according to claim 34, wherein the known buffer management policy is chosen from a group consisting of complete partitioning (CP), sharing with maximum queue lengths (SMXQ), sharing with minimum allocation (SMA), sharing with maximum queue length and minimum allocation (SMQMA), and dynamic threshold (DT).

36. The method according to claim 30, wherein a number of queues in the at least one group is fixed.

37. The method according to claim 30, wherein a number of queues in the at least one group and the portion of the space in the buffer are variable.

38. A method comprising:
selecting, from a plurality of queues of a buffer memory, a group of queues that meet or exceed a predetermined size, wherein each of the queues in the group of queues has a sequential integer ranking based on sizes of the queues in the group of queues;
allocating a portion of buffer memory to the group of queues according to a harmonic series based on the sequential integer rankings of the queues in the group of queues, wherein the portion of the buffer memory allocated to the group includes space that is not currently occupied by any of the queues in the group and that is collectively available for use by any of the queues in the group; and
allocating the portion of the buffer memory between members of the group of queues according to another harmonic series based on a number of queues in the group of queues, wherein after allocating the buffer memory between members of the group of queues, a maximum amount of allocated buffer memory for the group of queues is greater than a total maximum amount of buffer memory allocated to the group of queues using a complete partitioning buffer memory allocation policy.

39. The method of claim 38, wherein the group of queues comprises one or more active queues, and wherein a total portion of buffer memory allocated to the one or more active queues is defined by a ratio between a maximum buffer memory allocation and the one or more active queues.

40. The method of claim 38, wherein the harmonic series allocates a substantially large amount of buffer memory to accommodate an individual burst of packets while reserving buffer memory for queues in an inactive state that are waiting to receive packets.

41. The method of claim 38, wherein each queue independently adheres to a harmonic series buffer memory allocation policy, or to another buffer memory allocation policy.

42. The method of claim 38, wherein the harmonic series comprises a parametric harmonic policy.

43. The method of claim 38, wherein after allocating the buffer memory between members of the group of queues, a minimum amount of buffer memory is allocated to a group of remaining queues according to a harmonic series buffer memory allocation policy.

* * * * *

UNITED STATES PATENT AND TRADEMARK OFFICE
CERTIFICATE OF CORRECTION

PATENT NO. : 7,801,163 B2
APPLICATION NO. : 11/405024
DATED : September 21, 2010
INVENTOR(S) : Mansour et al.

It is certified that error appears in the above-identified patent and that said Letters Patent is hereby corrected as shown below:

On Title Page 2, item (56), under "Other Publications", Line 27, delete "et5 al.," and insert -- et al., --.

On Title Page 2, item (56), under "Other Publications", Line 54, delete "Fluif" and insert -- Fluid --.

On Title Page 2, item (56), under "Other Publications", Line 8, delete "Mark e. Crovella," and insert -- Mark E. Crovella, --.

On Title Page 2, item (56), under "Other Publications", Line 43, delete "Survays." and insert -- Surveys. --.

On Title Page 2, item (56), under "Other Publications", Line 57, delete ""shared Buffer" and insert -- "Shared Buffer --.

On Title Page 3, item (56), under "Other Publications", Line 17, delete "Fluif" and insert -- Fluid --.

Column 17, Line 46, in Claim 25, delete "The method of claim 24," and insert -- The device according to claim 24, --.

Signed and Sealed this
Nineteenth Day of June, 2012

David J. Kappos
*Director of the United States Patent and Trademark Office*